(12) United States Patent
Yamada et al.

(10) Patent No.: US 7,503,216 B2
(45) Date of Patent: Mar. 17, 2009

(54) DEVICE AND METHOD FOR EVALUATING RIGIDITY OF BEARING DEVICE, DEVICE AND METHOD FOR MANUFACTURING BEARING DEVICE, AND BEARING DEVICE

(75) Inventors: Hitoshi Yamada, Kanagawa (JP); Ichiro Joko, Kanagawa (JP)

(73) Assignee: NSK Ltd., Tokyo (JP)

( * ) Notice: Subject to any disclaimer, the term of this patent is extended or adjusted under 35 U.S.C. 154(b) by 746 days.

(21) Appl. No.: 10/492,160

(22) PCT Filed: Oct. 9, 2002

(86) PCT No.: PCT/JP02/10491

§ 371 (c)(1),
(2), (4) Date: Oct. 12, 2004

(87) PCT Pub. No.: WO03/034021

PCT Pub. Date: Apr. 24, 2003

(65) Prior Publication Data
US 2005/0041898 A1    Feb. 24, 2005

(30) Foreign Application Priority Data
Oct. 9, 2001    (JP)    ............................ 2001-311501

(51) Int. Cl.
*G01M 13/04* (2006.01)
(52) U.S. Cl. .......................................... 73/593; 73/660
(58) Field of Classification Search .................. 73/593, 73/587, 602, 660, 659, 865.3, 862.49, 862.59
See application file for complete search history.

(56) References Cited

U.S. PATENT DOCUMENTS

| | | | | |
|---|---|---|---|---|
| 4,078,434 A | * | 3/1978 | Weberhofer | ................. 73/593 |
| 4,615,216 A | * | 10/1986 | Vykoupil | ..................... 73/593 |
| 5,509,198 A | * | 4/1996 | Takamizawa et al. | .... 29/898.09 |
| 5,517,858 A | * | 5/1996 | Matsuzaki et al. | ............ 73/593 |
| 6,202,306 B1 | * | 3/2001 | Miyazaki | ................. 29/898.09 |
| 6,234,022 B1 | * | 5/2001 | Tadokoro | ..................... 73/593 |
| 6,322,254 B1 | * | 11/2001 | Schwinghammer et al. | . 384/537 |
| 6,378,373 B1 | * | 4/2002 | Metrikin | ..................... 73/593 |
| 6,526,829 B1 | * | 3/2003 | Lysen et al. | .................. 73/593 |

(Continued)

FOREIGN PATENT DOCUMENTS

JP    02-061700 A    12/1990

(Continued)

*Primary Examiner*—Helen C. Kwok
(74) *Attorney, Agent, or Firm*—Sughrue Mion, PLLC

(57) ABSTRACT

An apparatus of producing bearing device having a bearing, a shaft attached to an inner ring and an outer ring attaching member attached to an outer ring. The apparatus includes a vibrating unit of giving a radial input vibration to each inner ring or both ends of the shaft, and an input vibration detecting unit of detecting vibration of each inner ring or both ends of the shaft, an adding unit of calculating the output of the input vibration detecting unit, a vibration detecting unit of detecting the vibration of a mass attached to the outer ring attaching member, a transfer function calculating unit of determining the transfer function from the output of the vibration detecting unit and the adding unit to calculate the resonance frequency and a rigidity calculating unit of determining the rigidity of the bearing device on the basis of the resonance frequency.

17 Claims, 15 Drawing Sheets

U.S. PATENT DOCUMENTS 6,709,162 B2 * 3/2004 Muraki et al. .............. 384/504
6,918,302 B2 * 7/2005 Yamada ....................... 73/593

FOREIGN PATENT DOCUMENTS

| JP | 06-221962 A | 8/1994 |
| JP | 6-221962 A | 8/1994 |
| JP | 6-344233 A | 12/1994 |
| JP | 11-013755 A | 1/1999 |
| JP | 2882105 B2 | 2/1999 |
| JP | 2000-074788 A | 3/2000 |
| JP | 2000-146726 A | 5/2000 |
| JP | 2001-082493 A | 3/2001 |
| JP | 2001-83045 A | 3/2001 |
| JP | 2001-083045 A | 3/2001 |

* cited by examiner

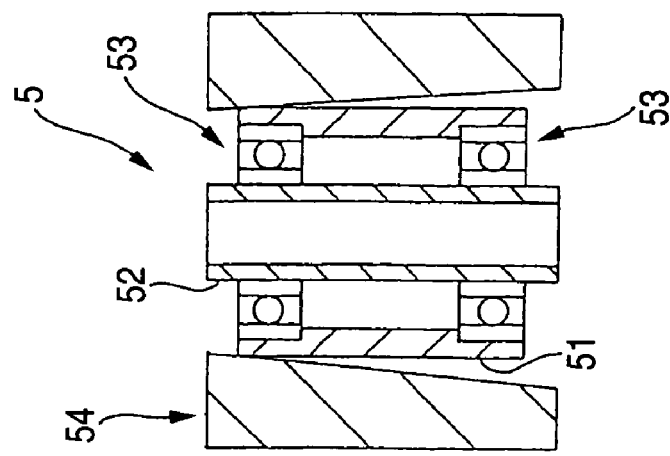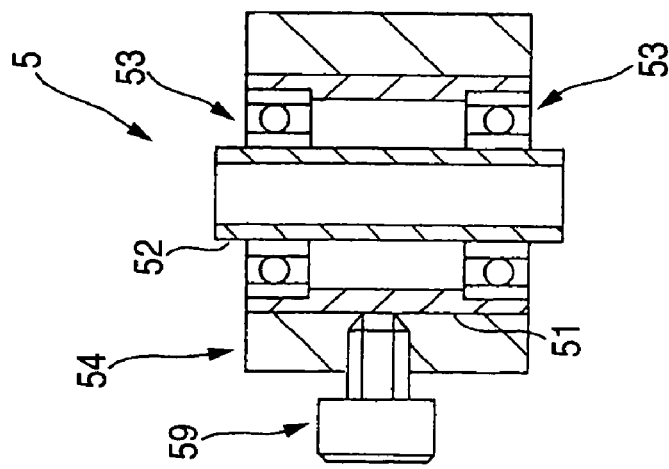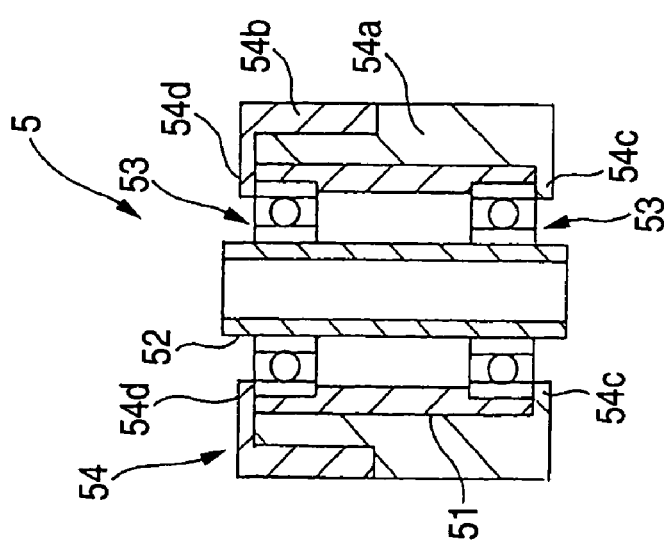

TRANSLATION MODE

CONICAL MODE

DEVICE AND METHOD FOR EVALUATING RIGIDITY OF BEARING DEVICE, DEVICE AND METHOD FOR MANUFACTURING BEARING DEVICE, AND BEARING DEVICE

TECHNICAL FIELD

The present invention relates to an apparatus and method of producing a bearing device which can be preferably used for a bearing device that meet an important requirement for radial rigidity during use (resonance properties) such as bearing device for swing arm in magnetic disc (hard disc drive).

BACKGROUND ART

Recently, magnetic disc devices have been more and more required to have a high density, and the swing arm having a head for reproducing/recording signal mounted thereon has been required to make faster access to the desired track and be positioned on the desired track more accurately (speeding up and enhancement of precision of positioning). It has thus been desired to control the radial resonance frequency of the bearing device for swing arm and eliminate the dispersion of rigidity of the bearing device.

In a controller (e.g., swing arm) having a bearing device incorporated therein, the dispersion of rigidity (resonance frequency) of the bearing device is one of factors causing the drop of efficiency of tuning of servo system. Therefore, techniques and apparatus of predetermining the rigidity (resonance frequency) of the bearing device to fall within a predetermined range have been considered important.

Patent Reference 1 cited below discloses a technique of controlling the radial resonance frequency of a bearing device for swing arm.

Further, Patent References 2, 3 and 4 cited below disclose a technique of determining the axial resonance frequency of a bearing device.

Moreover, Patent Reference 5 cited below discloses a method of producing a bearing device which includes press fitting while measuring the resonance frequency of the bearing device under the application of vibration from a piezoelectric element and terminating press fitting when the resonance frequency thus measured reaches a predetermined value.

[Patent Reference 1]
   JP-A-2001-83045 (FIG. 1, page 3)

[Patent Reference 2]
   Japanese Patent No. 2882105 (FIG. 1, pp. 4-5)

[Patent Reference 3]
   JP-A-2000-146726 (FIG. 1, pp. 4-6)

[Patent Reference 4]
   JP-A-2000-74788 (FIG. 1, pp. 4-5)

[Patent Reference 5]
   JP-A-6-344233 (FIG. 1, pp. 4-6)

However, in accordance with the prior art apparatus and methods of producing a bearing device, the rigidity of the bearing device in the radial direction (radial rigidity) can difficultly be directly evaluated.

In particular, the radial resonance frequency of a small-sized and light-weight bearing device such as bearing device for swing arm can difficultly be accurately measured because such a bearing device has a high resonance frequency attributed to radial rigidity and a small amplitude of resonance peak and the vibration mode of the measuring instrument system and the bearing device are superposed on each other. Further, when the resonance frequency of a plurality of vibration modes (radial translation mode, conical mode) of the bearing device in the radial direction are close to each other, the accurate resonance frequency cannot be determined, making it impossible to accurately evaluate radial rigidity.

Further, in accordance with the apparatus and method disclosed in Patent Reference 5 cited above, the resonance frequency of the pivot can be difficultly extracted from the vibration characteristics of the entire production device comprising the pivot to determine radial rigidity or resonance frequency in particular. The small size and light weight give an extremely high resonance frequency which, too, is a factor making this job difficult. This causes dispersion of resonance frequency, making it likely that the quality of the product thus produced can be unstable.

The present invention has been worked out under the circumstances and its aim is to provide a bearing device producing apparatus and method capable of producing a bearing device while accurately determining the radial rigidity thereof

DISCLOSURE OF THE INVENTION

The aim of the present invention is accomplished by the following constitutions.

(1) An apparatus of evaluating the rigidity of a bearing device comprising a bearing having an inner ring and an outer ring and an outer ring attaching member attached to the outer ring, characterized in that there are provided a unit of giving an input vibration to the inner ring or a shaft attached to the inner ring, a vibration detecting unit of detecting the vibration of the outer ring attaching member or a mass attached to the outer ring attaching member, a transfer function calculating unit of determining the transfer function from the output of the vibration detecting unit and the input vibration to calculate the resonance frequency of the bearing device and a rigidity calculating unit of determining the rigidity of the bearing device on the basis of the resonance frequency calculated by the transfer function calculating unit.

(2) An apparatus of evaluating the rigidity of a bearing device comprising a pair of bearings having an inner ring and an outer ring, a shaft attached to the inner ring and an outer ring attaching member attached to the outer ring, characterized in that there are provided an vibrating unit of giving a radial input vibration to each of the inner rings or the both ends of the shaft, a pair of input vibration detecting units of detecting the vibration of each of the inner rings or the both ends of the shaft, an adding unit of calculating the output of said pair of input vibration detecting unit, a vibration detecting unit of detecting the vibration of the outer ring attaching member or a mass attached to the outer ring attaching member, a transfer function calculating unit of determining the transfer function from the output of the vibration detecting unit and the adding unit to calculate the resonance frequency of the bearing device and a rigidity calculating unit of determining the rigidity of the bearing device on the basis of the resonance frequency calculated by the transfer function calculating unit.

(3) A method of evaluating the rigidity of a bearing device comprising a pair of bearings having an inner ring and an outer ring, a shaft attached to the inner ring and an outer ring attaching member attached to the outer ring, which includes attaching a mass to the outer ring, giving a radial input vibration to each of the inner rings or the both ends of the shaft, detecting the vibration of each of the inner rings or the both ends of the shaft to obtain a first detected vibration value and a second detected vibration value, adding the first detected vibration value and the second detected vibration value to obtain a sum, detecting the vibration of the outer ring attaching member or the mass to obtain a third detected vibration value, determining the transfer function from said third detected vibration value and the sum to calculate the resonance frequency of the bearing device, and then determining the rigidity of the bearing device on the basis of said resonance frequency.

(4) An apparatus of producing a bearing device comprising a bearing having an inner ring and an outer ring and an outer ring attaching member attached to the outer ring, characterized in that there are provided an vibrating unit of giving a radial input vibration to the inner ring or the shaft mounted thereon, a vibration detecting unit of detecting the vibration of the outer ring attaching member or a mass attached to the outer ring attaching member, a transfer function calculating unit of determining the transfer function from the output of the vibration detecting unit and the input vibration to calculate the resonance frequency of the bearing device and a rigidity calculating unit of determining the rigidity of the bearing device on the basis of the resonance frequency calculated by the transfer function calculating unit.

(5) An apparatus of producing a bearing device comprising a pair of bearings having an inner ring and an outer ring, a shaft attached to the inner ring and an outer ring attaching member attached to the outer ring, characterized in that there are provided an vibrating unit of giving a radial input vibration to the inner ring or the shaft mounted thereon, a vibration detecting unit of detecting the vibration of the outer ring attaching member or a mass attached to the outer ring attaching member, a transfer function calculating unit of determining the transfer function from the output of the vibration detecting unit and the input vibration to calculate the resonance frequency of the bearing device and a rigidity calculating unit of determining the rigidity of the bearing device on the basis of the resonance frequency calculated by the transfer function calculating unit.

(6) A method of producing a bearing device comprising a pair of bearings having an inner ring and an outer ring, a shaft attached to the inner ring and an outer ring attaching member attached to the outer ring, which includes attaching a mass to the outer ring, giving a radial input vibration to each of the inner rings or the both ends of the shaft, detecting the vibration of each of the inner rings or the both ends of the shaft to obtain a first detected vibration value and a second detected vibration value, adding the first detected vibration value and the second detected vibration value to obtain a sum, detecting the vibration of the outer ring attaching member or the mass to obtain a third detected vibration value, determining the transfer function from said third detected vibration value and the sum to calculate the resonance frequency of the bearing device, and then determining the rigidity of the bearing device on the basis of said resonance frequency.

(7) An apparatus of producing a bearing device comprising a bearing having an inner ring and an outer ring and a housing fitted on the outer ring, characterized in that at least one of radial rigidity, resonance frequency and anti-resonance frequency is detected and when the value thus detected reaches a predetermined value, press fitting is terminated.

(8) The apparatus of producing a bearing device as described in Clause (7), wherein there are provided an vibrating unit of giving radial vibration to the inner ring or a shaft fitted in said inner ring, a loading unit for press fitting, a vibration detecting unit of detecting the vibration at least one site on the shaft or inner ring and the housing or outer ring and an operation controlling unit of determining the rigidity, resonance frequency or anti-resonance frequency of the bearing device from the signal detected by the vibration detecting unit.

(9) The apparatus of producing a bearing device as described in Clause (7) or (8), wherein there is provided a transfer function calculating unit to determine resonance frequency.

(10) A method of producing a bearing device which includes using a production apparatus as described in any one of Clauses (7) to (9) to produce a bearing device.

(11) A bearing device having a radial rigidity predetermined by a production method as described in Clause (6) or (10).

In accordance with the constitutions, the transfer function concerning the vibration in the direction of deformation of the bearing device can be determined to accurately determine the radial rigidity of the bearing device.

In accordance with the constitutions, isophase and isoamplitude components (vibration components developed at sites other than bearing device) detected at each of the inner and outer rings can be separated from each other to extract the vibration properties of the bearing device alone. In particular, when a mass is attached to the outer ring attaching member to increase the weight and moment of inertia of the movable portion comprising the outer ring and the outer ring attaching member, the detection of resonance peak can be easily conducted. This is because the rise of the weight of the movable portion makes it possible to reduce the resonance frequency due to radial rigidity and raise the amplitude of resonance peak. Further, the rise of the moment of inertia allows effective reduction of the resonance frequency of the bearing device in conical mode, making it possible to increase the difference from the resonance frequency in radial translation mode and hence conduct accurate measurement of resonance frequency.

Moreover, in accordance with the constitutions, the radial rigidity or resonance frequency of the bearing device can fall within a predetermined range, making it easy to effect tuning of the servo system when the bearing device is incorporated in, e.g., a swing arm. Further, the precision in measurement of radial rigidity or resonance frequency can be drastically enhanced. Moreover, the enhancement of the precision in measurement of radial rigidity or resonance frequency makes it possible to stabilize the quality of a pivot which has been press-fitted in resonance mode.

BRIEF DESCRIPTION OF THE DRAWINGS

FIGS. 4A to 4C are diagrams illustrating a method of attaching a mass to the bearing device of the first embodiment.

Figure 1:
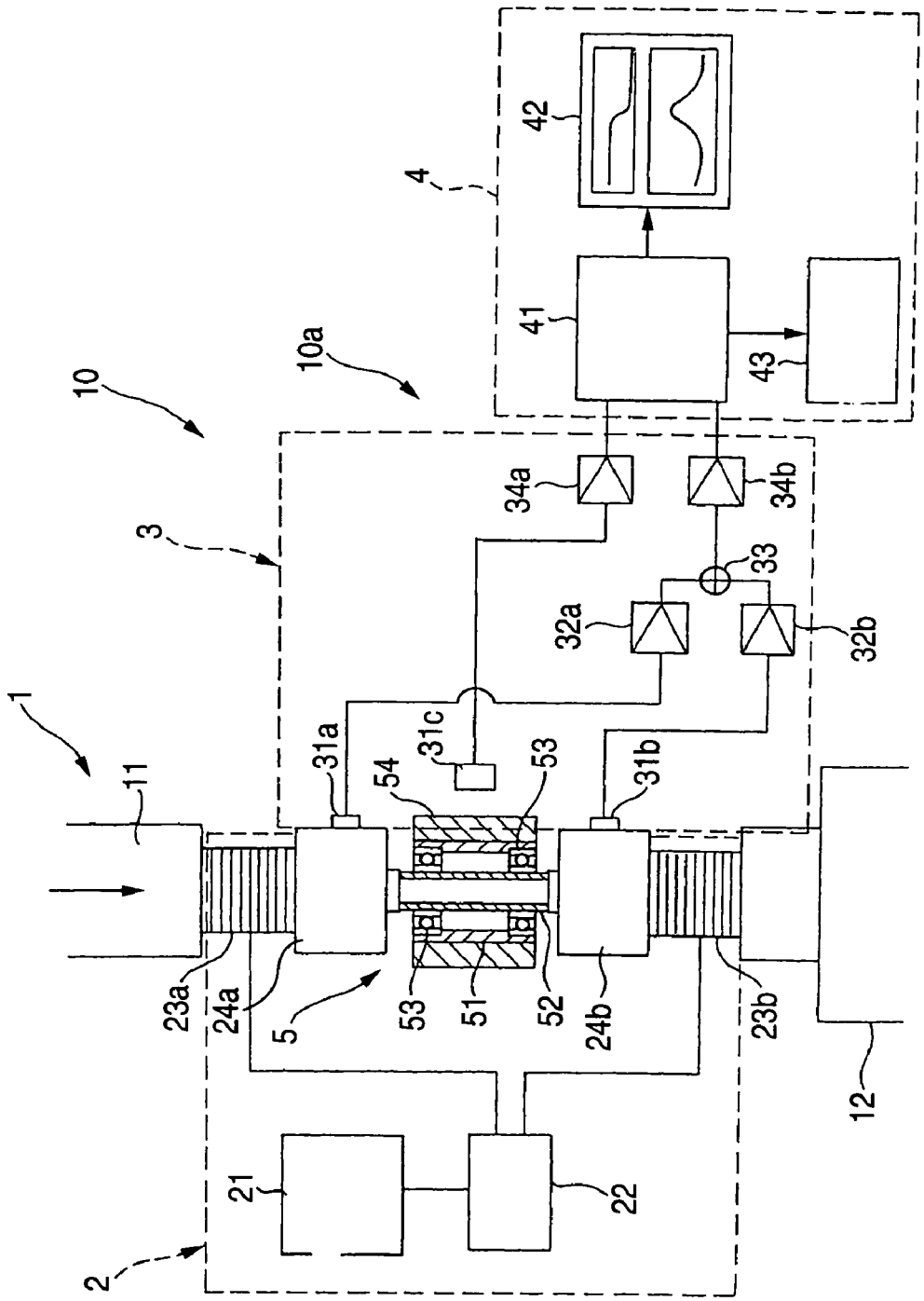
FIG. 1 is a general view of an apparatus of producing a bearing device according to a first embodiment of implementation of the present invention.

In these figures, the reference numeral 1 indicates a support portion, the reference numeral 2 indicates an vibrating portion, the reference numeral 3 indicates a vibration detecting portion, the reference numeral 4 indicates an operation processing portion, the reference numeral 5 indicates a bearing device, the reference numerals 10 and 60 each indicate an apparatus of producing a bearing device, the reference numeral 23a indicates a piezoelectric element type vibrator (vibrating unit), the reference numerals 31a to 31c each indicate a vibration detecting sensor (vibration detecting unit), the reference numeral 33 indicates an adder (adding unit), the reference numeral 41 indicates a transfer function calculating unit (rigidity calculating unit), the reference numeral 43 indicates a rigidity conversion device, the reference numeral 51 indicates a housing (outer ring attaching member), the reference numeral 52 indicates a shaft, the reference numeral 53 indicates a rolling bearing, and the reference numeral 54 indicates a mass.

BEST MODE FOR CARRYING OUT THE INVENTION

Embodiments of implementation of the present invention will be described in detail in connection with the drawings.

In the second and following embodiments, the members having the same constitution and action as that of those described already will be given the same reference numerals and signs in figures to simplify or omit their description.

As shown in FIG. 1, the apparatus 10 of producing a bearing device of the first embodiment mainly include a rigidity evaluation device 10a having a support portion 1 of supporting and fixing the bearing device 5 in the axial direction, an vibrating portion 2 of vibrating the bearing device 5 in the radial direction, a vibration detecting portion 3 of detecting the radial vibration of the bearing device 5 and an operation processing portion 4 of evaluating the radial rigidity of the bearing device 5 on the basis of the output of the vibration detecting portion 3.

Herein, the bearing device 5 has two ball bearings 53, 53 disposed axially apart from each other, a shaft 52 fitted in the inner ring thereof and a housing (outer ring attaching member) 51 fitted on the outer ring thereof. The mass 54 is attached to the periphery of the housing 51. The weight of the mass 54 may be the same as the load actually applied to a device (e.g., swing arm bearing device for magnetic disc device) in which the bearing device 5 is incorporated. The shape (center of gravity, moment of inertia) of the mass 54, too, maybe equivalent to that of parts (e.g., swing arm) actually born by the bearing device 5.

A supporting portion 1 has a loading device 11 disposed on one end (upper end) of the shaft 52 to give a fixing power to the shaft 52 of the bearing device 5 and load cell (load sensor) 12 disposed on the other end (lower end) of the shaft 52 to monitor the load. In this arrangement, the shaft 52 can be fixed at a constant load. The loading device 11 and the load cell 12 may be disposed on the same side of the bearing device 5. A supporting part 24a and an a vibrator 23a described later are disposed interposed between one end of the shaft 52 and the loading device 11 while a supporting part 24b and a vibrator 23b are disposed interposed between the other end of the shaft 52 and the load cell 12. Since the state of fixing of the both ends of the shaft 52 to the supporting parts 24a, 24b affects the results of evaluation of radial rigidity, it is desired that the shaft 52 be fixed at a proper load by the loading device 11 and the load cell 12.

The vibrating portion 2 has an oscillator 21 of generating a voltage waveform in which sinusoidal wave sweeps at a high speed with a predetermined frequency range, a pair of piezoelectric element type vibrators 23a, 23b of generating an vibrating force at an amplitude and frequency corresponding to the voltage waveform generated by the oscillator 21 and an amplifier 22 disposed interposed between the oscillator 21 and the vibrators 23a, 23b. When the pair of vibrators 23a, 23b vibrate at the same phase in the radial direction, radial vibration is given to the bearing device 5. The vibration excited in the bearing device 5 includes radial translation mode attributed to the radial rigidity of the bearing device 5 (mode of vibration based on the translation of radial rigidity of the housing 51 and the elastic flexing of the shaft 52), conical mode (mode of vibration based on the inclination of the housing 51), elastic vibration mode of parts of the bearing device 5 and vibration mode came from the measuring instrument system including the supporting portion 1 and the vibration portion 2 superposed on each other.

The vibration detecting portion 3 has a vibration detecting sensor 31c disposed at the axially central position between the housing 51 and the mass 54 and vibration detecting sensors 31a, 31b disposed on the supporting parts 24a, 24b at the both ends of the shaft 52, respectively. These vibration detecting sensors 31a, 31b, 31c are disposed on the same plane including the axial direction of the shaft 52. As the vibration detecting sensors 31a, 31b and 31c there may be used properly a piezoelectric element type sensor, a laser non-contact type sensor, a record pick up, etc. The vibration detected by the various vibration detecting sensors 31a, 31b and 31c includes the various modes superposed on each other. The output signal of the vibration detecting sensors 31a, 31b on the both ends of the shaft 52 (first detected vibration value, second detected vibration value), respectively, are amplified by amplifiers 32a, 32b, and then added at the adder 33. This addition causes the conical vibration component of the shaft 52 to be eliminated, giving a signal of translation mode of the shaft 52.

The signal outputted from the adder 33 is an added signal and thus is amplified by a main amplifier 34b. Thereafter, the level (amplitude) of the signal is halved.

The operation processing portion 4 has a transfer function calculating unit 41 which receives an output signal (third detected vibration value) from the vibration detecting sensor 31c via an amplifier 34a as well as an output signal from the adder 33 via the amplifier 34b. The transfer function calculating unit 41 makes the use of fast Fourier transform (FFT) to calculate the resonance frequency (characteristic frequency)

fr of the bearing device 5. In some detail, the transfer function H of the inner and outer rings (between shaft 52 and housing 51) is calculated by FFT to cause isophase and isoamplitude vibrating components included in the various signals inputted to be separated and hence cause radial resonance frequency fr to appear at a phase difference of $\pi/2$. At this point, since the vibration detecting sensor 31c observes the axial center between the housing 51 and the mass 54, conical mode in which the component falls and vibrates with the axial center of the housing 51 as a node can be difficultly detected and the radial translation mode is mainly detected.

The timing at which the oscillator 21 of the vibrating portion 2 generates a voltage waveform and the timing at which the transfer function calculating unit 41 of the operation processing portion 4 performs sampling are completely synchronized.

Figure 2:
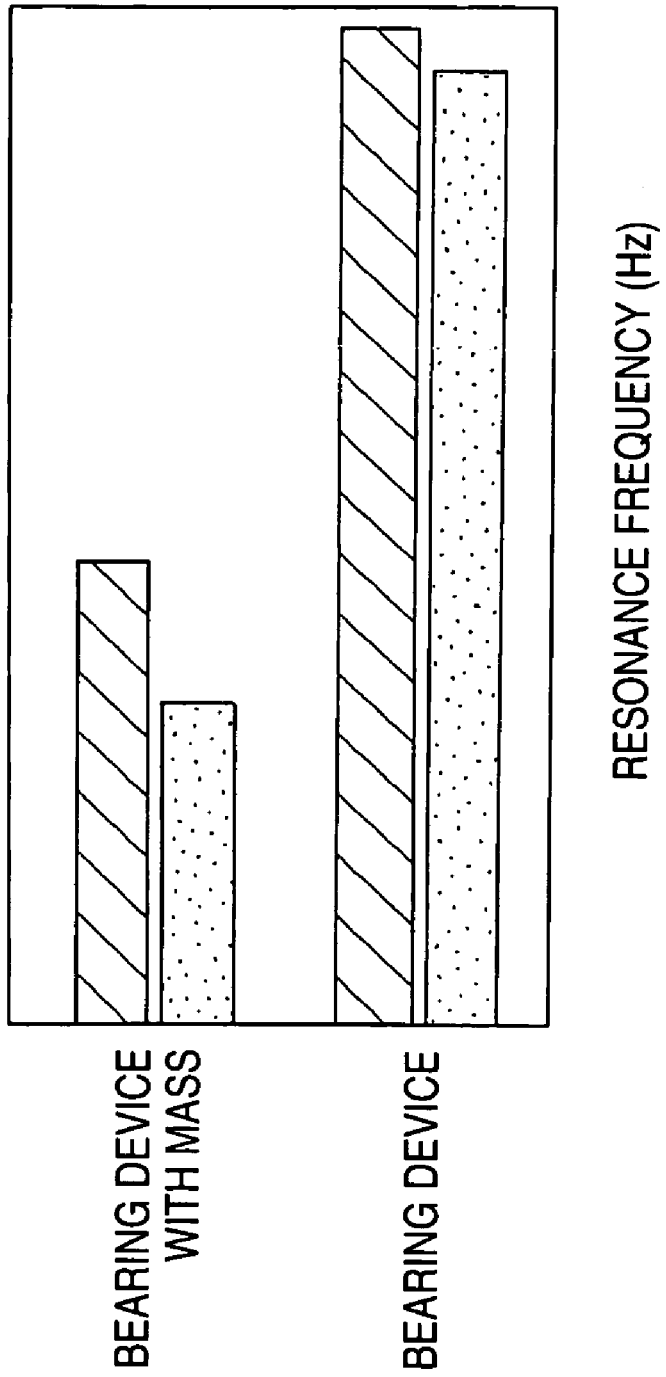
FIG. 2 is a graph illustrating the effect developed by adding a mass in the first embodiment.

In the present embodiment, the mass 54 is attached to the housing 51 of the bearing device 5 to reduce the resonance frequency as compared with the case where no mass is added (bearing device alone) as shown in FIG. 2. Further, the addition of the mass 54 makes the difference in resonance frequency between radial translation mode and conical mode about 10 times that in the case of bearing device alone.

Figure 3A:
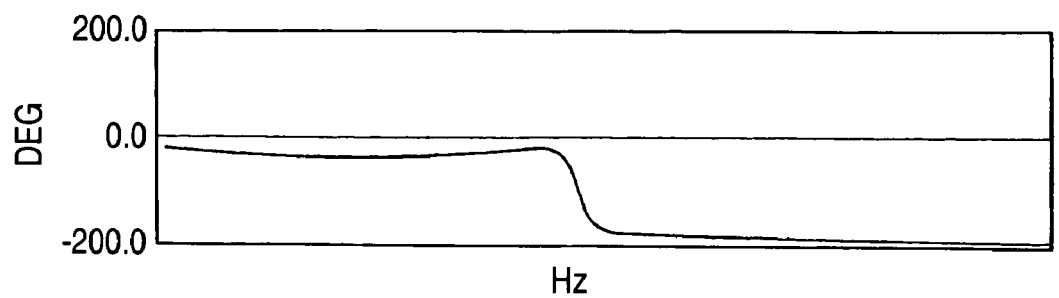
FIGS. 3A and 3B are graphs illustrating the frequency characteristics of a transfer function in the first embodiment.
Figure 3B:
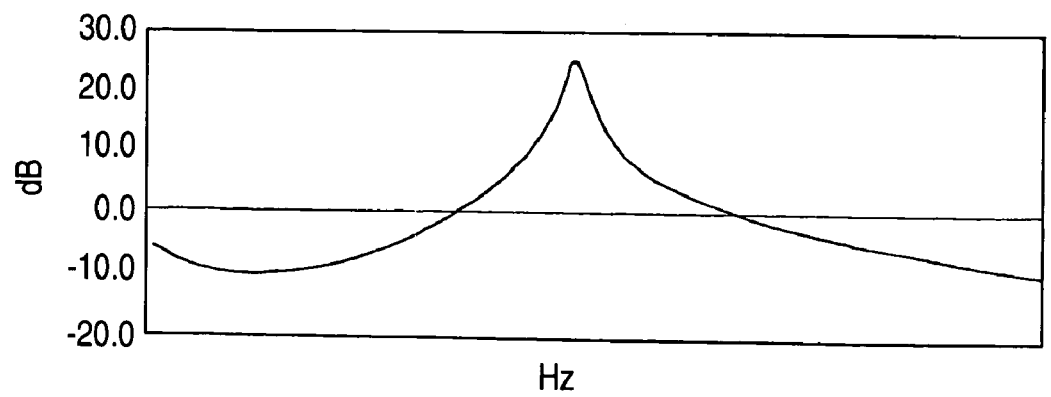

FIGS. 3A and 3B illustrate the frequency characteristics of transfer function H calculated by the rigidity evaluation device 10a. FIG. 3A illustrates the phase difference and FIG. 3B illustrates the amplitude (gain).

When the bearing 53 of the bearing device 5 is free of seal or grease, the attenuation possessed by the bearing 53 is negligibly small and there is no difference in evaluation of rigidity between by the measurement of frequency at which the phase difference of transfer function H is $-\pi/2$ and by the measurement of frequency at which the amplitude is at peak.

However, when the bearing 53 of the bearing device 5 is provided with a seal or filled with a grease, the attenuation possessed by the bearing 53 is not negligible. In this case, the dispersion of frequency at which the amplitude is at peak increases. Nevertheless, there occurs no dispersion in the frequency at which the phase difference is $-\pi/2$, and evaluation by the phase difference can be conducted to maintain the precision in rigidity evaluation in the present invention.

The waveform of FIGS. 3A, 3B is displayed on a waveform display 42 as shown in FIG. 1. Further, the radial resonance frequency fr determined is inputted to the rigidity conversion device 43. Since the relationship between the radial resonance frequency and the radial rigidity of the bearing device is nonlinear and the radial rigidity cannot be directly determined from the radial resonance frequency, the following method is employed. The rigidity conversion device 43 performs FEM (Finite Element Method) analysis to approximate the relationship between the previously determined radial rigidity and radial resonance frequency fr of the bearing device by a polynomial and then uses the polynomial to calculate the radial rigidity Kr of the bearing device with respect to the radial resonance frequency fr inputted. In some detail, since Kr=f(fr, $\alpha$) is defined as a function indicating the relationship between radial rigidity Kr and resonance frequency fr, contact angle $\alpha$ is previously subjected to FEM analysis to determine a discrete value from which the function is approximated by a polynomial having resonance frequency fr as a variable. Using this polynomial, measured resonance frequency fr can be converted to radial rigidity Kr.

In the case where the radial rigidity Kr of the bearing device thus determined falls below or exceeds the predetermined value, the radial rigidity of the bearing device is optimized by re-predetermining the preload or otherwise.

Next, a method of attaching the mass 54 to the housing 51 of the bearing device 5 will be described in connection with FIGS. 4A to 4C.

In the example shown in FIG. 4A, the mass 54 is formed by two members, i.e., first portion 54a and second portion 54b. The stepped cylindrical first 54a having an inwardly protruding flange 54c provided at the end on the large diameter side thereof is attached to the periphery of the housing 51, and the cylindrical second portion 54b is threaded onto or otherwise attached to the periphery of the small diameter portion of the first portion 54a. There is provided a flange 54d also at the other end of the second portion 54b, and the flange 54d and the flange 54c of the first portion 54a clamp and fix the housing 51 and the pair of bearings 53, 53 along the shaft. Since the axial deformation of the housing 51 by the effect of clamping and fixing can change the preload in the bearing device 5, it is desired that the deformation be previously determined for correction.

In the example shown in FIG. 4B, the cylindrical mass 54 is screwed on the periphery of the housing 51. Herein, the radially extending hole of the mass 54 is threaded such that when a screw 59 is driven, the mass 54 moves inwardly. Since the contact of the periphery of the housing 51 with the inner surface of the mass 54 or the deformation of the housing 51 by the axial force of the screw 59 greatly affects the evaluation of radial rigidity, it is desired that the screw 59 be driven with a proper torque.

In the example shown in FIG. 4C, the axial hole of the mass 54 forms a tapered hole the inner surface of which is bitten by one end face of the housing 51 which is a chamfered surface so that the mass 54 is fixed to the housing 51. In this case, too, since the contact of the mass 54 with the chamfered portion of the housing 51 affects the evaluation of radial rigidity, it is desired that the fixing conditions be stabilized by providing a guide portion or otherwise so that the insert force can be controlled to keep the shaft 52 and the mass 54 coaxial.

In the embodiments, as shown in FIG. 1, the output signal from the vibration detecting sensor 31c is inputted to the transfer function calculating unit 41 via the amplifier 34a while the output signal from the adder 33 is inputted to the transfer function calculating unit 41 via the amplifier 34b.

Figure 5:
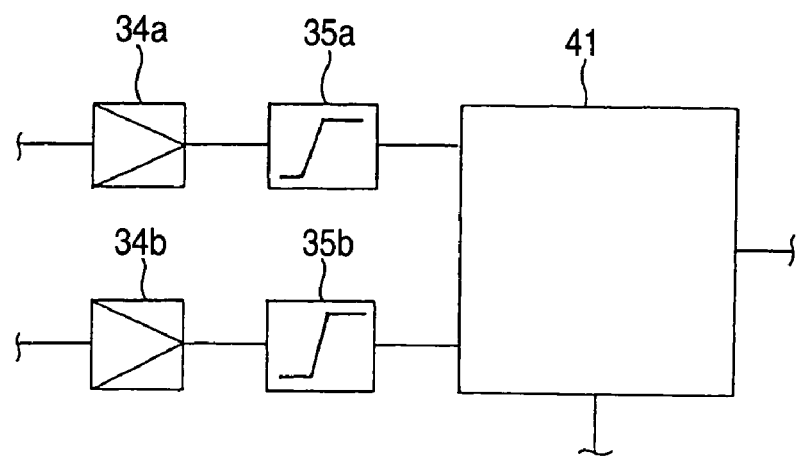
FIG. 5 is a diagram illustrating a modification of the first embodiment.

However, the present invention is not limited to these embodiments, and high pass filters 35a, 35b can be provided interposed between the amplifiers 34a, 34b and the transfer function calculating unit 41 as shown in FIG. 5. In this arrangement, unnecessary frequency components of external noises such as power supply noise can be cut off to enhance S/N ratio. The constitutions which are no shown in FIG. 5 may be similar to that of FIG. 1.

Further, in the embodiments, the rigidity evaluation device 43 performs FEM analysis to approximate the relationship between the previously determined radial rigidity and radial resonance frequency fr of the bearing device 5 by a polynomial by which the radial rigidity Kr of the bearing device with respect to the radial resonance frequency inputted is calculated. However, the present invention is not limited to these embodiments, and on the basis of, e.g., a supposed one-freedom model comprising the weight M of the movable portion consisting of the outer ring and housing 51 of the bearing 53 and the mass 54 and a spring having a radial rigidity Kr, the radial rigidity Kr can be easily determined from the resonance frequency fr in the rigidity conversion device 43. In the model, the radial rigidity Kr is represented by:

$$Kr = 4M(\pi fr)^2$$

Substituting M which has been previously determined from the outer ring, the housing 51 and the mass 54 and measured fr for M and fr, respectively, in the equation yields the radial rigidity Kr.

Figure 6:
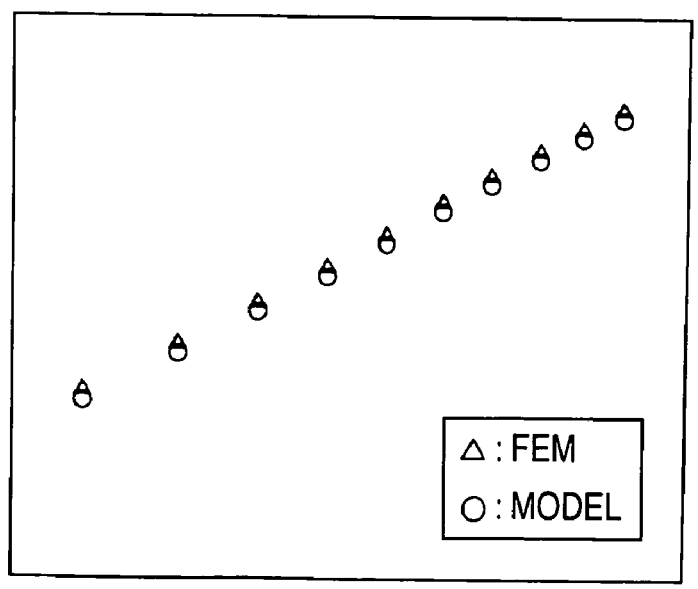
FIG. 6 is a graph illustrating the effect of another modification.

FIG. 6 is a graph illustrating the comparison of radial rigidity determined by the use of FEM analysis with radial rigidity determined by the use of one-freedom model. Thus, the two models have a high relationship to give a very small error.

By determining the transfer function concerning the vibration of the bearing device 5 in the direction of deformation, the radial rigidity of the bearing device 5 can be accurately determined.

In accordance with the apparatus 10 of producing a bearing device according to a first embodiment, isophase and isoamplitude components (vibration components developed at sites other than bearing device) detected at each of the inner and outer rings can be separated from each other to extract the vibration properties of the bearing device alone. In particular, when the mass 54 is attached to the housing 51 to increase the weight and moment of inertia of the movable portion comprising the outer ring and the housing 51, the detection of resonance peak can be easily conducted. This is because the rise of the weight of the movable portion makes it possible to reduce the resonance frequency due to radial rigidity and raise the amplitude of resonance peak. Further, the rise of the moment of inertia allows effective reduction of the resonance frequency of the bearing device 5 in conical mode, making it possible to increase the difference from the resonance frequency in radial translation mode and hence conduct accurate measurement of resonance frequency.

Next, an apparatus of producing a bearing device according to a second embodiment of implementation of the present invention will be described.

Figure 7:
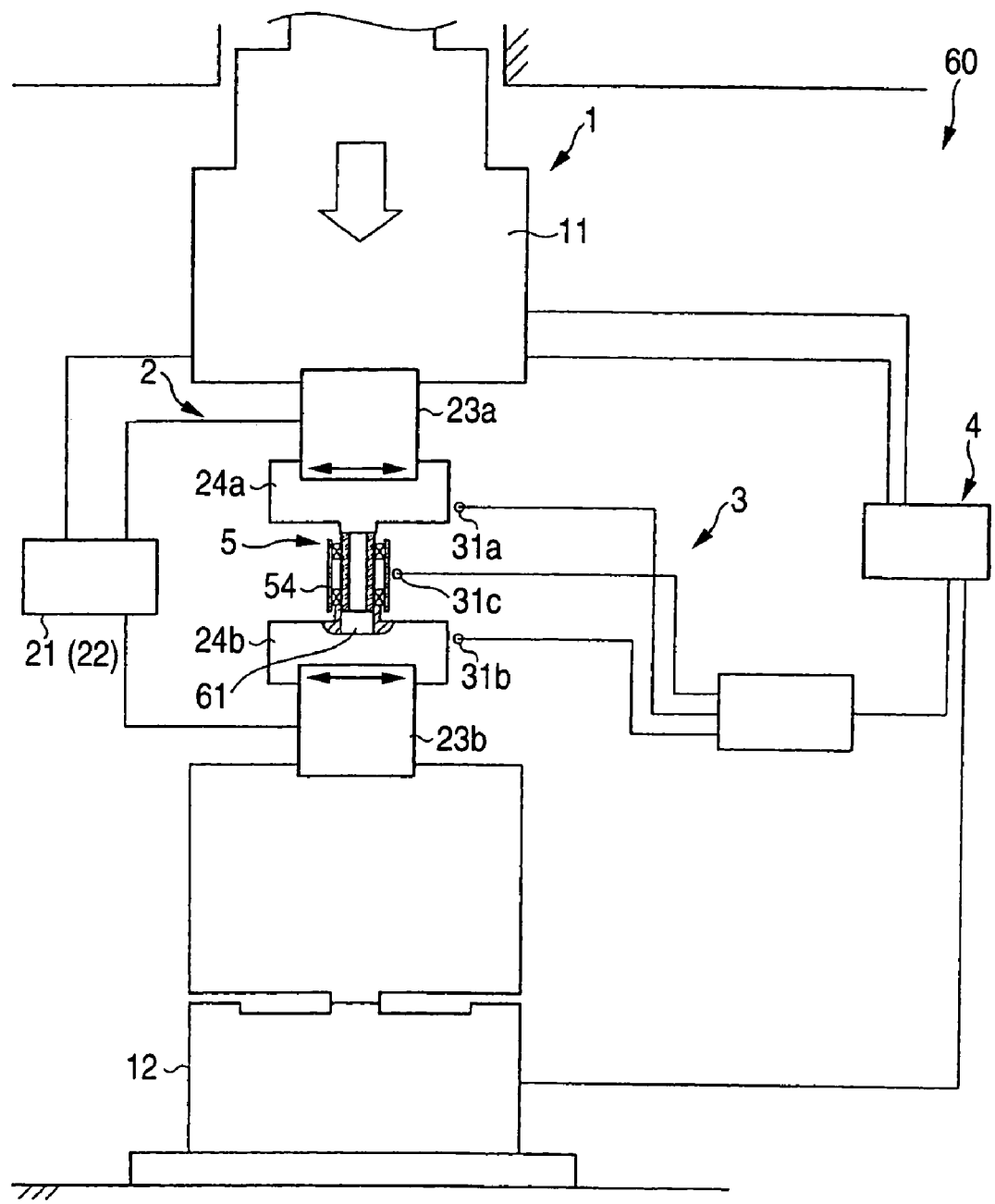
FIG. 7 is a general view of an apparatus of producing a bearing device according to a second embodiment of implementation of the invention.

As shown in FIG. 7, in the apparatus 60 of producing a bearing device according to the second embodiment, a pair of vibrators 23a, 23b apply radial vibration to the both ends of a pivot via a press fitting fixture 61. As the vibrators 23a, 23b there are preferably used those having a sufficient strength and rigidity in the axial direction, e.g., piezo electric element or magnetostrictive element. The vibration signal generated by the vibrators 23a, 23b results in good swept sinusoidal signal.

On vibrator 23a is connected to a direct acting loading device 11 such as hydraulic or feed screw mechanism while the other vibrator 23b is connected to the load cell 12, making it possible to detect the press fitting force. The press fitting force is fed back to control the feed rate and is used also for correction of measurements as described later.

The vibration sensors 31a, 31b and 31c are disposed on the both ends of the shaft 52 or on the press fitting fixture 61 and the housing 51 or on the periphery of the outer ring. The vibration sensors 31a, 31b and 31c are linearly disposed on the same plane as that of the vibrating direction.

The vibration sensors 31a, 31b and 31c each may be of fixed type such as acceleration pickup, feeler type such as record needle or non-contact type such as laser Doppler speedometer.

The two signals from the respective ends of the shaft are added to each other, halved in level, passed through a filter, subjected to AD conversion, and then subjected to FFT analysis. The addition causes subtraction of vibration components which are out of phase from each other at the both ends of the shaft, and the signal thus processed is equivalent to the vibration signal at the center of the shaft 52. This signal is supposed to be an input signal Xa.

The signal from the housing 51 or the outer ring is subjected to the same processing as described above (no addition) This is supposed to be a response signal Xb.

Using the following equation, a transfer function is calculated from the input signal Xa and the response signal Xb. Herein, Xb* is a conjugated complex number.

$$H(j\omega)=Xb \times Xb^*/Xa \times Xb^*$$

Figure 8:
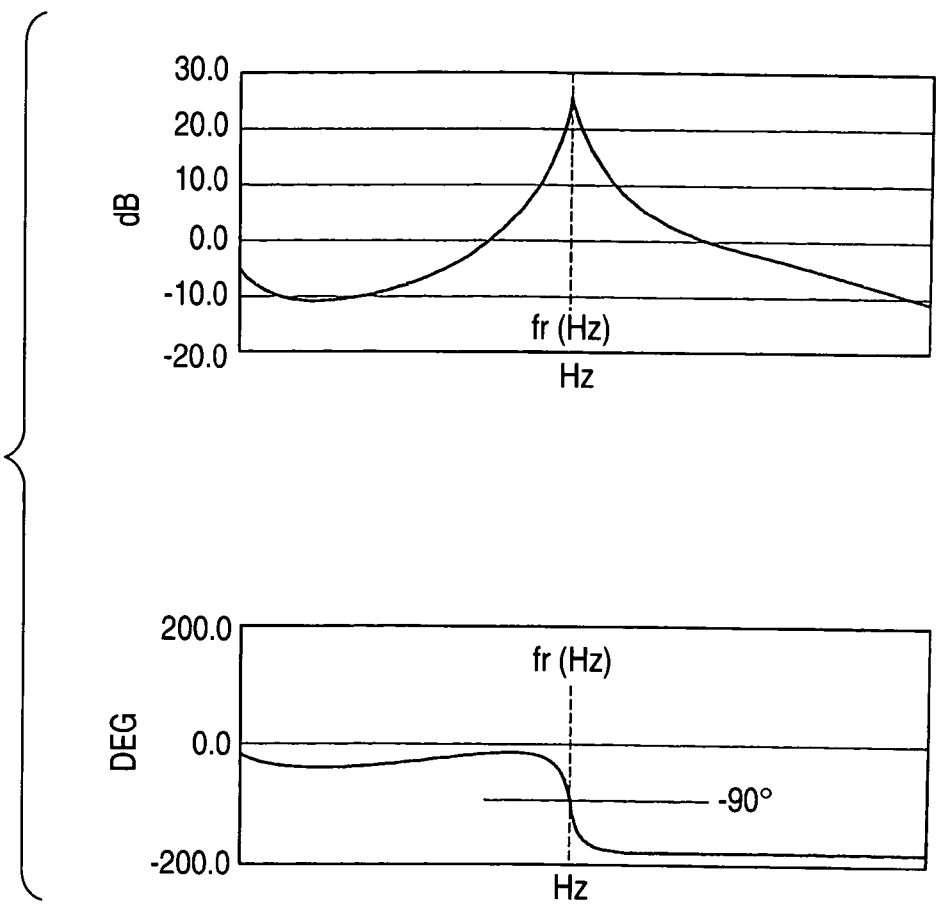
FIG. 8 is a diagram of frequency characteristics developed after calculation of FFT transfer function in the second embodiment.

As shown in FIG. 8, the frequency characteristics of gain and phase difference obtained from the results of calculation show that the frequency at which the gain peak or phase difference is −90° is the resonance frequency of the pivot.

By detecting the vibration of the two masses (inner ring and outer ring in this case) opposed to each other via bearing rigidity and determining the transfer function therebetween, only the frequency characteristics of a local system includes bearing rigidity and weight of outer ring and housing 51 can be extracted for evaluation.

Figure 9:
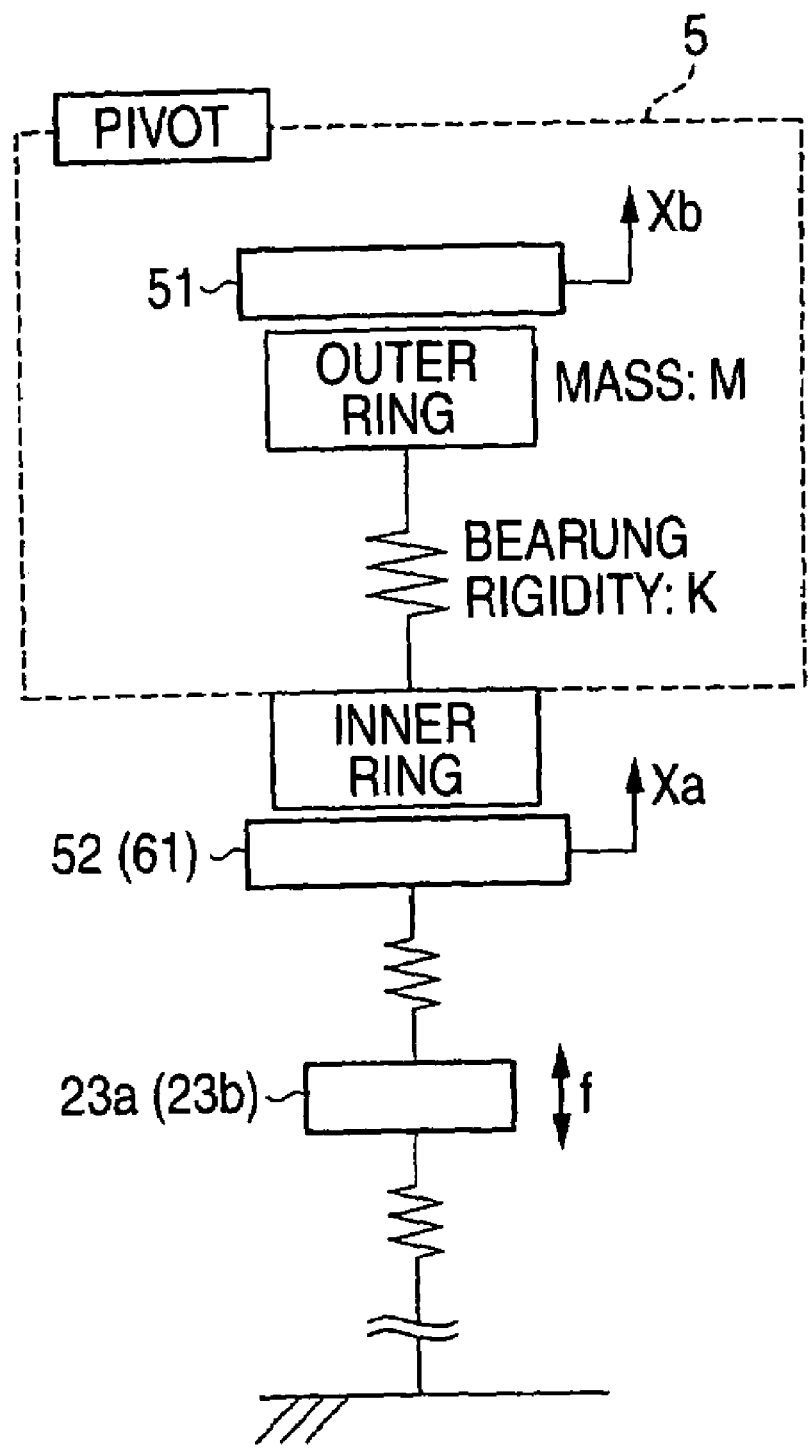
FIG. 9 is a conceptional diagram of transfer function which is a vibration model in the second embodiment.

The effect is represented in the vibration model shown in FIG. 9.

Referring to a method of determining rigidity from resonance frequency, rigidity is represented by the following equation.

$$f=(1/2\pi) \times \sqrt{(k/M)}$$

Substituting known weight M and determined resonance frequency f in M and f, respectively, in the equation yields rigidity k.

Alternatively, a relationship between bearing rigidity and characteristic frequency which has been previously established by a numerical analysis such as finite element method may be used.

During press fitting, the load corresponding to press fitting force acts on the shaft 52, causing the change of solid preload and hence deviating the resonance frequency from the unloaded value. Therefore, the measured value is subjected to correction for shaft load. Using the load F detected by the load cell 12, the normal frequency is determined by the following equation.

$$Fr=C(F) \times i$$

wherein Fr is the normal frequency; F is the frequency measured; and C(F) is a correction coefficient.

In accordance with the second embodiment, the radial rigidity or resonance frequency of the bearing device is allowed to fall within a predetermined range, making it easy to perform tuning of servo system when the bearing device is incorporated in, e.g., a swing arm. Further, the precision in measurement of radial rigidity or resonance frequency can be drastically enhanced. Moreover, the enhancement of precision in measurement of radial frequency or resonance frequency makes it possible to stabilize the quality of a pivot which has been press-fitted in resonance mode.

A modification of the second embodiment will be described hereinafter.

Any resonance frequency may be measured so far as it appears in the radial direction of the pivot.

Figure 10A:
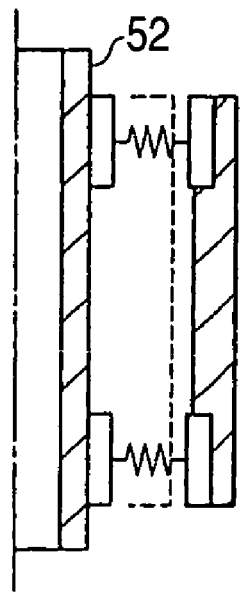
FIGS. 10A and 10B is a diagram illustrating the radial vibration mode of a pivot in the second embodiment.
Figure 10B:
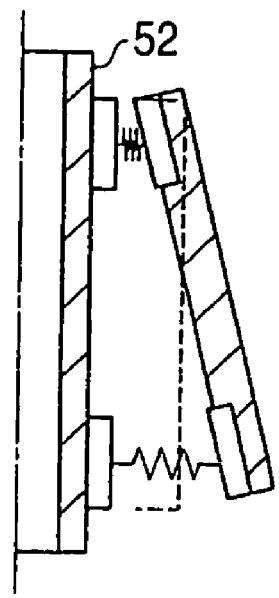

For example, there is a translation mode shown in FIG. 10A or a rigid body mode called conical mode shown in FIG. 10B.

An additional mass may be added. The effect of such an additional mass is to increase the weight of the outer ring, lowering the resonance frequency of the bearing device 5 and hence making it possible to evaluate the resonance frequency within a low frequency range giving little effect of noise. Further, the amplitude during resonance is amplified, making it easy to detect peak.

At the same time, the moment of inertia of the outer ring is increased to lower the characteristic frequency of conical mode. Even in the case where the characteristic frequency in translation mode and conical mode are close to each other and thus can difficultly be individually distinguished in normal operation, they can be easily distinguished from each other by making these characteristic frequencies different.

In order to decide the shape of the additional mass, it is effective to tune the weight, moment of inertia and center of gravity such that the individual modes have a desired resonance frequency. For example, it is preferred that the center of gravity be at the center of the bearing span.

Since the rigidity (contact rigidity) of the additional mass mounting portion affects the resonance frequency of the pivot, a method of firmly fixing the additional mass is. preferably used.

Using a swing arm main body attached to the bearing device instead of additional mass, evaluation may be conducted under actual working conditions.

FIGS. 11A, 11B, 11C, 11D and 11E each illustrate a method of mounting the additional mass.

Figure 11A:
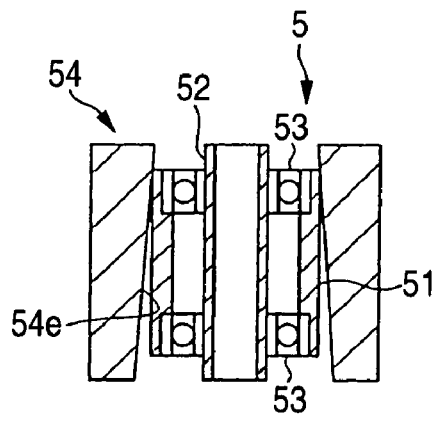
FIGS. 11A to 11E are diagrams illustrating a method of attaching a mass in the second embodiment.

In FIG. 11A, the inner hole of a cylindrical additional mass 54 is a tapered hole 54e which is bitten by the chamfered portion of the outer ring or housing 51. In accordance with this mounting method, the pushing force is controlled, making it possible to fix the additional mass 54 to the bearing device 5 firmly and stably. This case is similar to FIG. 4C.

Figure 11B:
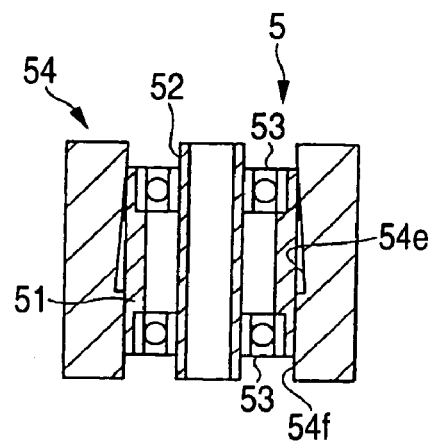

In FIG. 11B, a straight portion 54f is formed in a part of the tapered hole 54e so that the additional mass 54 can be prevented from being fixed inclined.

Figure 11C:
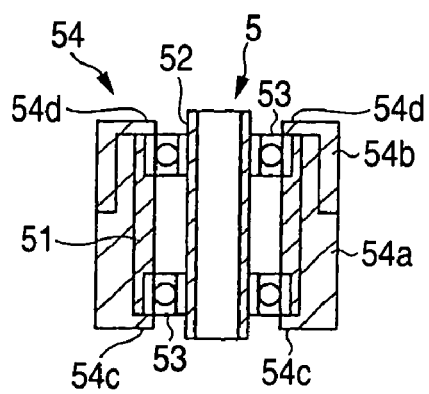

FIG. 11C illustrates a cylinder including two divisions which clamp the ends of the bearing device. This case is similar to FIG. 4A.

Figure 11D:
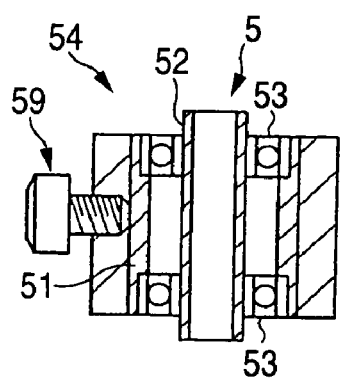

In FIG. 11D, a cylindrical additional mass is fixed to the side of the housing with a screw. In this case, screw fixing may be replaced by adhesion. This case is similar to FIG. 4A.

Figure 11E:
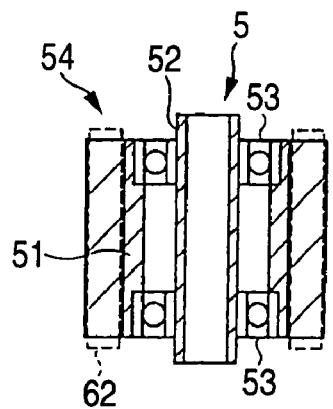

In FIG. 11E, the radial expansion and shrinkage of a hollow cylindrical piezoelectric element 62 is utilized.

Figure 12:
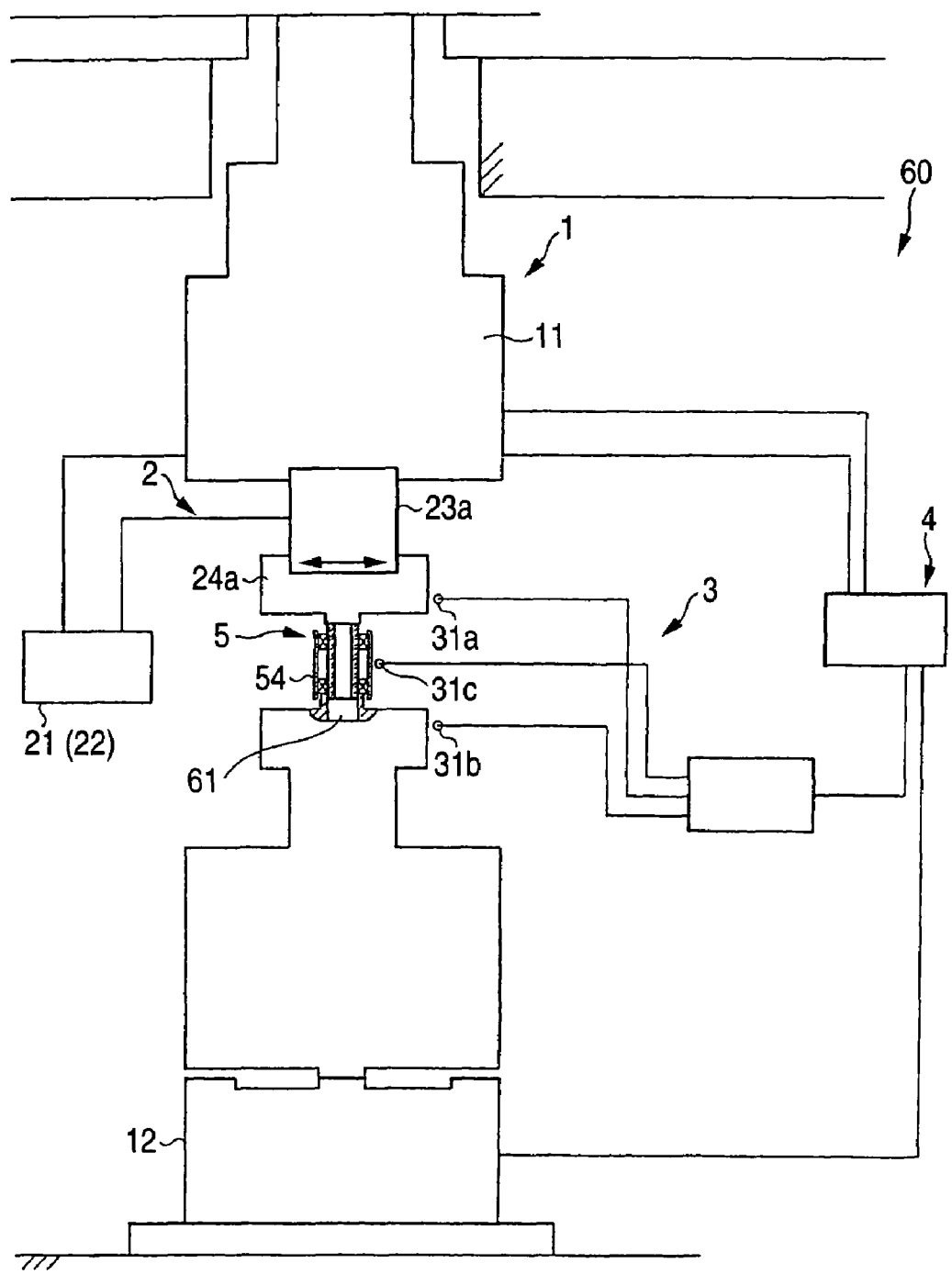
FIG. 12 is a general view of a modification of the second embodiment.

FIG. 12 illustrates a modification involving the elimination or driving of any one of the upper and lower vibrators. In this case, only one vibrator 23a is used.

The driving mode can be freely excited also by arranging such that the upper and lower vibrators can be driven at individual amplitudes and phases. In general, the upper and lower vibrators are driven at the same phase and amplitude.

Figure 13:
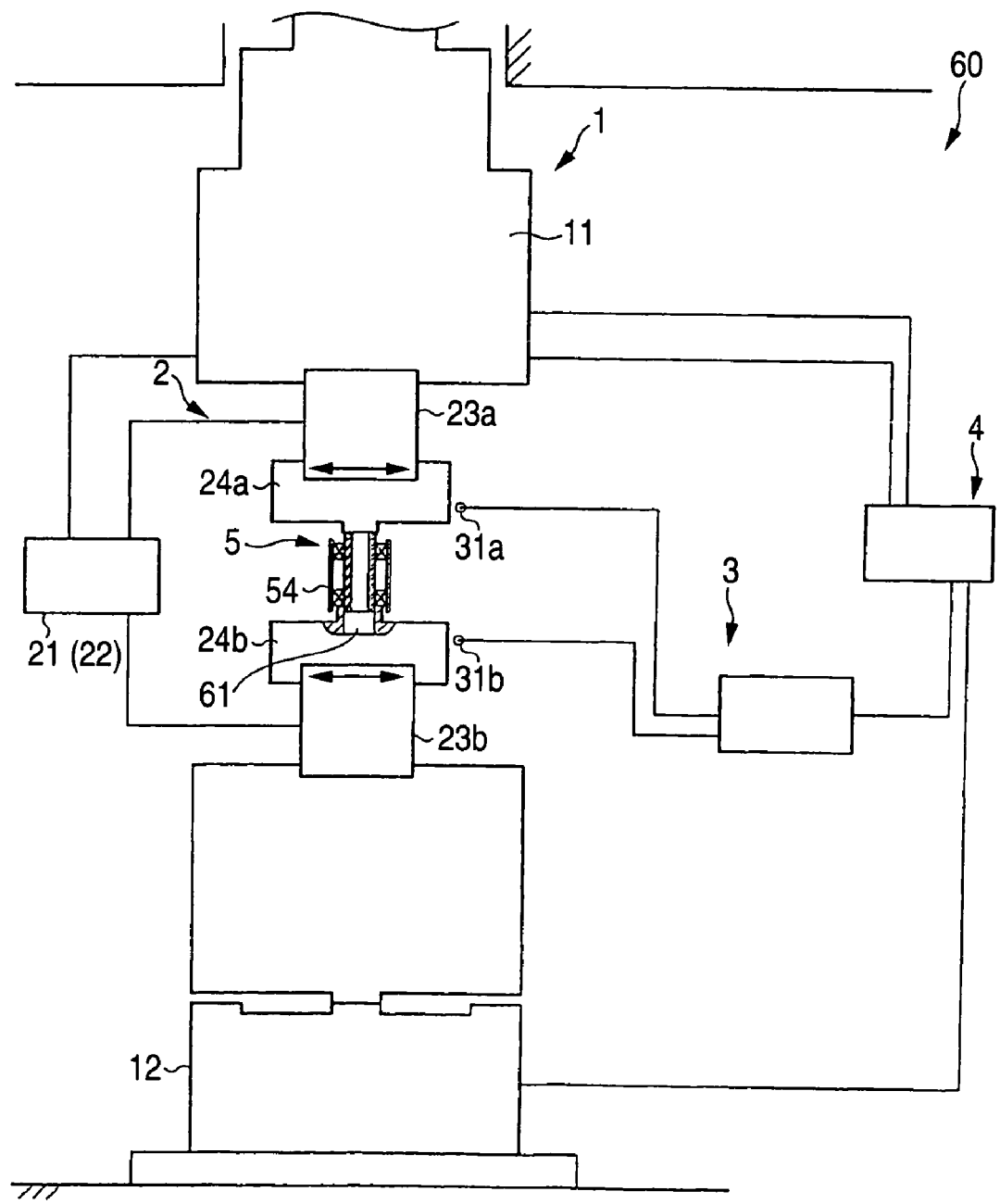
FIG. 13 is a general view of another modification of the second embodiment.

FIG. 13 illustrates a modification involving the detection of only the vibration signal Xa of the both ends of the shaft or the press fitting 61 from which anti-resonance frequency is determined.

Figure 14:
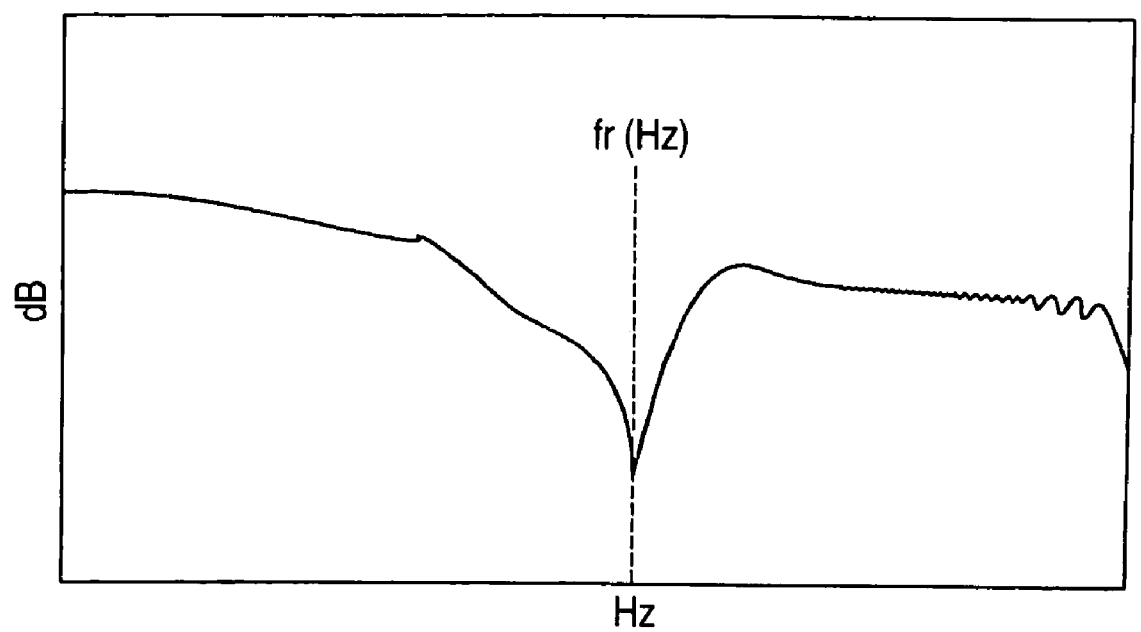
FIG. 14 is a diagram of waveform measured in the modification shown in FIG. 13.

FIG. 14 illustrates the waveform of measurements in the present modification.

In this case, the vibration amplitude of the housing 51 and the outer ring becomes maximum at the resonance frequency of the bearing device 5, and the system in resonance acts as a dynamic vibration absorber to damp the vibration of the inner ring and the shaft 52, minimizing the amplitude and hence keeping anti-resonance. Therefore, by detecting the vibration of only the inner ring and the shaft 52 and then determining the anti-resonance frequency, the same effect as that by determining the resonance frequency of the bearing device 5 can be exerted. In this arrangement, the number of sensors or circuits can be reduced, making it possible to reduce cost.

Referring to another modification which is a simple method, resonance frequency can be determined from time axis data.

In this case, a transfer function is determined from two signals in a time range. The resonance frequency can be estimated from the relationship between the amplitude of the transfer function and the previously determined amplitude and resonance frequency of the system. This can be applied also to the anti-resonance method.

The effect of this method is to eliminate the necessity of FFT and hence speed up calculation. This leads to cost reduction and recyclability enhancement. The time required to judge resonance frequency can be reduced, making it possible to enhance the precision in positioning of press fitting and reduce the dispersion of rigidity.

Further, as other modification, the vibration unit may be modified.

To this end, a method involving the vibration of the entire device in the radial direction or a method involving the vibration of the housing 51 may be used.

For example, a method which includes hitting the housing 51, a method which includes striking the vibrators 23a, 23b against the housing 51, a method which includes applying sound wave to the housing 51 to vibrate the housing 51 in non-contact process, a method which includes applying a magnetic field from an outer ring which is a coil to the housing 51, etc. may be used.

Figure 15:
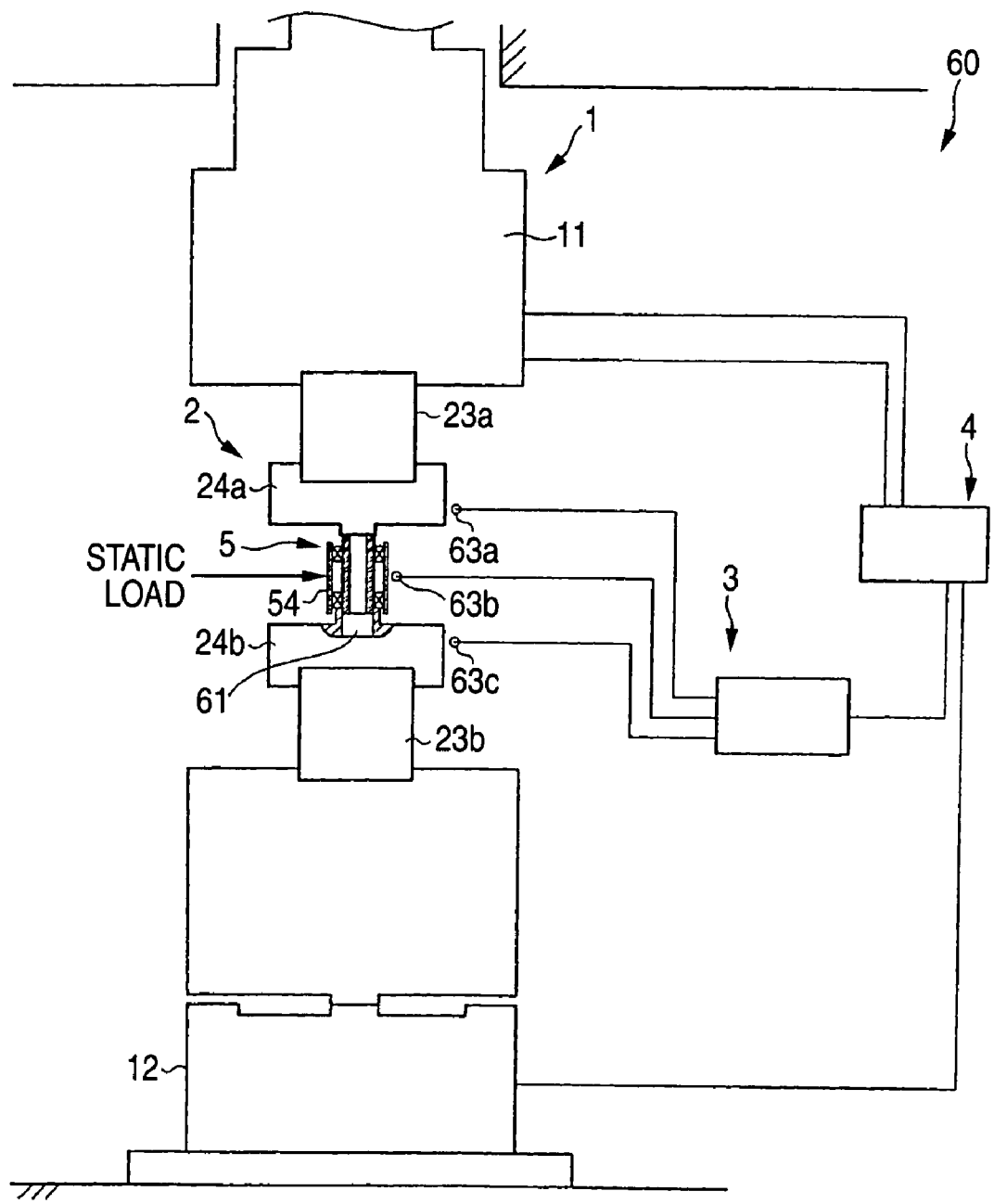
FIG. 15 is a general view of other modification in the second embodiment.

As shown in FIG. 15, the housing 51 can be press-fitted to the bearing device 5 while determining the static radial rigidity of the bearing device 5 from the displacement measured at a static load using Hooke's Law.

In this case, the displacement of the housing 51, the inner ring and the shaft 52 is measured by a contact type or non-contact type displacement meter while the housing 51 or the outer ring is being under static load. Displacement meters 63a, 63b and 63c are disposed at the positions corresponding to that of the vibration sensors 31a, 31b and 31c.

For measurement, the following equation is used.

$$F=K(x2-x1)$$

wherein F is the load; x1 is the displacement of the loaded point; and x2 is the displacement of the shaft and inner ring.

Measurement and press fitting can be conducted while rotating the outer ring.

In this case, the circumferential dispersion of rigidity which can occur due to precision in ball position, race, etc. can be evaluated.

Further, as a resonance measuring function, vibration and measurement may be conducted on the press fitting device while fixing the work at the press fitting force or less. In this case, a structure for clamping the ends of the shaft is used instead of the press fitting fixture. Other mechanisms may be the same as the structure according to the second embodiment.

Figure 16:
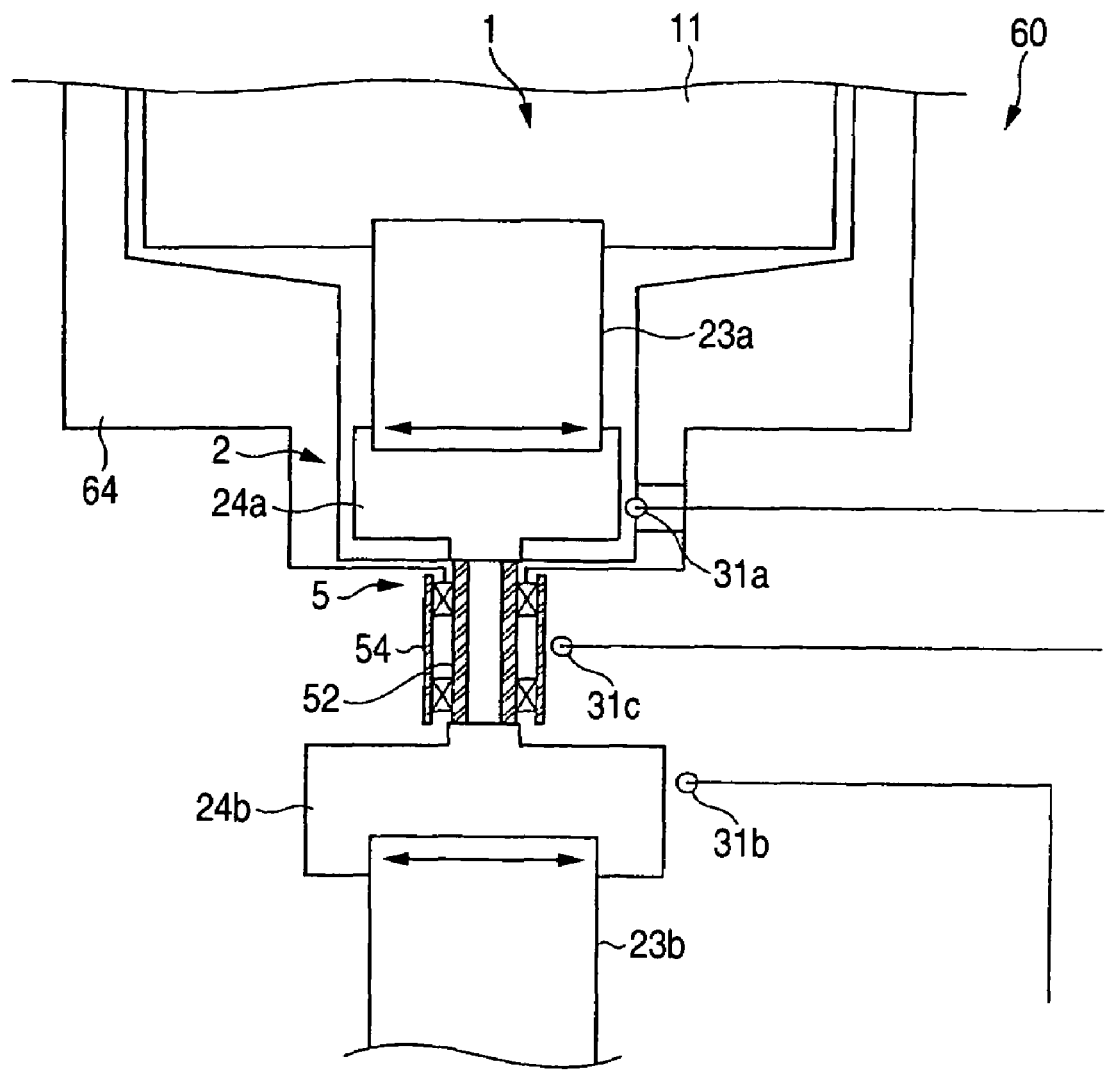
FIG. 16 is a general view of further modification in the second embodiment.

As shown in FIG. 16, the press fitting mold (loading device) 64 may be struck against the inner ring on the periphery thereof while the ends of the shaft are clamped by the vibrators 23a, 23b. In this case, the various loading devices are separate mechanisms by which the clamping force and the press fitting force can be separately controlled.

In general, an article having a small press fitting force cannot be provided with a sufficient clamping force. In this case, the vibration force cannot be thoroughly transferred to this article. Further, the contact rigidity of the press fitting type bearing device supporting portion is reduced, making it impossible to measure correct resonance frequency. In this arrangement, however, an article having a small press fitting force can be provided with a sufficient clamping force, making it possible to determine correct resonance frequency.

The present invention is not limited to the embodiments and can be properly modified, improved or otherwise changed.

For example, the various modifications may be combined as necessary.

The bearing device is not limited to ball bearing but may be a cylindrical roller bearing or tapered roller bearing.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2001-311501, filed on Oct. 9, 2001 and the contents thereof are incorporated herein by reference.

INDUSTRIAL APPLICABILITY

As mentioned above, in accordance with the present invention, the transfer function concerning the vibration of the bearing device in the direction of deformation is determined, making it possible to accurately determine the radial rigidity of the bearing device.

Further, in accordance with the present invention, isophase and isoamplitude vibration components (vibration components other than vibration attributed to the rigidity of the bearing device) included in the vibration of each of the inner and outer rings are separated from each other to determine radial resonance frequency (characteristic frequency). In particular, when a mass is attached to the outer ring attaching member to increase the weight and moment of inertia of the movable portion comprising the outer ring and the outer ring attaching member, the detection of resonance peak can be easily conducted. This is because the rise of the weight of the movable portion makes it possible to reduce the resonance frequency due to radial rigidity and raise the amplitude of resonance peak. Further, the rise of the moment of inertia allows effective reduction of the resonance frequency of the bearing device in conical mode, making it possible to increase the difference from the resonance frequency in radial translation mode and hence conduct accurate measurement of resonance frequency.

Moreover, the radial rigidity or resonance frequency of the bearing device can fall within a predetermined range, making it easy to effect tuning of the servo system when the bearing device is incorporated in, e.g., a swing arm. Further, the precision in measurement of radial rigidity or resonance frequency can be drastically enhanced. Moreover, the enhancement of the precision in measurement of radial rigidity or resonance frequency makes it possible to stabilize the quality of a pivot which has been press-fitted in resonance mode.

Thus, a bearing device producing apparatus and method capable of producing a bearing device while accurately determining the radial rigidity thereof can be provided.

The invention claimed is:

1. An apparatus for evaluating a radial rigidity of a bearing device including a bearing having an inner ring, a shaft attached to the inner ring, an outer ring and an outer ring attaching member attached to the outer ring, comprising:
a mass attached to the outer ring attaching member;
an input vibration unit for giving a radial input vibration to one of the inner ring and the shaft attached to the inner ring;
a vibration detecting unit for detecting a vibration of one of the outer ring attaching member and the mass;
a transfer function calculating unit for calculating a transfer function from an output of the vibration detecting unit and the radial input vibration to determine a resonance frequency of the bearing device; and
a radial rigidity calculating unit for determining a radial rigidity of the bearing device on the basis of the resonance frequency of the bearing device determined by the transfer function calculating unit.

2. An apparatus for evaluating a radial rigidity of a bearing device including a pair of bearing having an inner ring and an outer ring, a shaft attached to the inner ring and an outer ring attaching member attached to the outer ring, comprising:
a mass attached to the outer ring attaching member;
an input vibration unit for giving a radial input vibration to one of the each inner ring and both ends of the shaft attached to the inner ring;
a pair of vibration detecting units for detecting a vibration of one of the each inner ring and the both ends of the shaft attached to the inner ring;
an adding unit for adding an output of the pair of vibration detecting units;
a vibration detecting unit for detecting a vibration of one of the outer ring attaching member and the mass;
a transfer function calculating unit for calculating a transfer function from an output of the vibration detecting unit and the output of the adding unit to determine a resonance frequency of the bearing device; and
a radial rigidity calculating unit for determining a radial rigidity of the bearing device on the basis of the resonance frequency of the bearing device determined by the transfer function calculating unit.

3. A method for evaluating a radial rigidity of a bearing device including a pair of bearing having an inner ring and an outer ring, a shaft attached to the inner ring and an outer ring attaching member attached to the outer ring, comprising the steps of:
attaching a mass to the outer ring;
giving a radial input vibration to one of each inner ring and both ends of the shaft attached to the inner ring;
detecting a vibration of the one of each inner ring and both ends of the shaft attached to the inner ring so that a first vibration detecting value and a second vibration detecting value are obtained;
adding a first vibration and a second vibration so that an added value of the first vibration detecting value and the second vibration detecting value is obtained;
detecting a vibration of one of the outer ring attaching member attached to the outer ring and the mass so that a third vibration detecting value is obtained;
calculating a transfer function from the third vibration detecting value and the added value so that a resonance frequency of the bearing device is determined; and
calculating a rigidity of the bearing device from the transfer function.

4. An apparatus for producing a bearing device including a bearing having an inner ring, a shaft attached to the inner ring, an outer ring and an outer ring attaching member attached to the outer ring, comprising:
an input vibration unit for giving a radial input vibration to one of the each inner ring and the shaft;
a vibration detecting unit for detecting a vibration of one of the outer ring attaching member and a mass attached to the outer ring attaching member;
a transfer function calculating unit for calculating a transfer function from an output of the vibration detecting unit and the radial input vibration to determine a resonance frequency of the bearing device; and
a radial rigidity calculating unit for determining a radial rigidity of the bearing device on the basis of the resonance frequency of the bearing device determined by the transfer function calculating unit.

5. An apparatus for producing a bearing device including a pair of bearing having an inner ring and an outer ring, a shaft attached to the inner ring, and an outer ring attaching member attached to the outer ring, comprising:
   a mass attached to the outer ring attaching member;
   an input vibration unit for giving a radial input vibration to one of each inner ring and both ends of the shaft attached to the inner ring;
   a pair of vibration detecting units for detecting a vibration of one of the each inner ring and the both ends of the shaft attached to the inner ring;
   an adding unit for adding an output of the pair of vibration detecting units;
   a vibration detecting unit for detecting a vibration of one of the outer ring attaching member and the mass;
   a transfer function calculating unit for calculating a transfer function from an output of the vibration detecting unit and the output of the adding unit to determine a resonance frequency of the bearing device; and
   a radial rigidity calculating unit for determining a radial rigidity of the bearing device on the basis of the resonance frequency of the bearing device determined by the transfer function calculating unit.

6. A method for producing a bearing device including a pair of bearing having an inner ring and an outer ring, a shaft attached to the inner ring and an outer ring attaching member attached to the outer ring, comprising the steps of:
   attaching a mass to the outer ring;
   giving a radial input vibration to one of each inner ring and both ends of the shaft attached to the inner ring;
   detecting a vibration of one of the each inner ring and the both ends of the shaft attached to the inner ring so that a first vibration detecting value and a second vibration detecting value are obtained;
   adding a first vibration and a second vibration so that an added value of the first vibration detecting value and the second vibration detecting value is obtained;
   detecting a vibration of one of the outer ring attaching member attached to the outer ring and the mass so that a third vibration detecting value is obtained;
   calculating a transfer function from the third vibration detecting value and the added value so that a resonance frequency of the bearing device is determined; and
   calculating a radial rigidity of the bearing device from the transfer function.

7. An apparatus for producing a bearing device including a bearing having an inner ring, a shaft attached to the inner ring, an outer ring and a housing fitted to the outer ring, comprising:
   a detecting unit for detecting at least one of a radial rigidity, a resonance frequency and an anti-resonance frequency;
   wherein a press-fitting operation is finished when the at least one of the radial rigidity, the resonance frequency and the anti-resonance frequency become a predetermined value.

8. The Apparatus for producing a bearing device including a bearing having an inner ring, a shaft attached to the inner ring, an outer ring and a housing fitted to the outer ring according to claim 7, further comprising:
   an input vibration unit for giving a radial vibration to one of the inner ring and a shaft inwardly fitted to the inner ring;
   a loading unit for press-fitting;
   a vibration detecting unit for detecting a vibration of at least one of one of the each inner ring and the shaft and one of the outer ring and the housing; and
   a calculating control unit for calculating one of a rigidity of the bearing device and both a resonance frequency and an anti-resonance frequency from a signal detected by the vibration detecting unit.

9. The Apparatus for producing a bearing device including a bearing having an inner ring and an outer ring and a housing fitted to the outer ring according to claim 7, further comprising:
   a transfer function calculating unit for calculating a transfer function.

10. A method for producing a bearing device, comprising the step of:
    producing the bearing device by the apparatus according to claim 7.

11. A bearing device, comprising:
    the bearing device having a radial rigidity value set by the method according to claim 6.

12. An apparatus for evaluating a radial rigidity of a bearing device including a bearing having an inner ring, a shaft attached to the inner ring, an outer ring and an outer ring attaching member attached to the outer ring, comprising:
    an input vibration unit for giving a radial input vibration to the inner ring and the shaft attached to the inner ring;
    a vibration detecting unit for detecting a vibration of the outer ring attaching member;
    a transfer function calculating unit for calculating a transfer function from an output of the vibration detecting unit and the radial input vibration to determine a resonance frequency of the bearing device; and
    a radial rigidity calculating unit for determining a radial rigidity of the bearing device on the basis of the resonance frequency of the bearing device determined by the transfer function calculating unit.

13. An apparatus for evaluating a radial rigidity of a bearing device including a pair of bearing having an inner ring and an outer ring, a shaft attached to the inner ring and an outer ring attaching member attached to the outer ring, comprising:
    an input vibration unit for giving a radial input vibration to one of the each inner ring and both ends of the shaft attached to the inner ring;
    a pair of vibration detecting units for detecting a vibration of one of the each inner ring and the both ends of the shaft attached to the inner ring;
    an adding unit for adding an output of the pair of vibration detecting units;
    a vibration detecting unit for detecting a vibration of the outer ring attaching member;
    a transfer function calculating unit for calculating a transfer function from an output of the vibration detecting unit and the output of the adding unit to determine a resonance frequency of the bearing device; and
    a radial rigidity calculating unit for determining a rigidity of the bearing device on the basis of the resonance frequency of the bearing device determined by the transfer function calculating unit.

14. A method for evaluating a rigidity of a bearing device including a pair of bearing having an inner ring and an outer ring, a shaft attached to the inner ring and an outer ring attaching member attached to the outer ring, comprising the steps of:
    giving a radial input vibration to one of each inner ring and both ends of the shaft attached to the inner ring;
    detecting a vibration of the one of each inner ring and both ends of the shaft attached to the inner ring so that a first vibration detecting value and a second vibration detecting value are obtained;

adding a first vibration and a second vibration so that an added value of the first vibration detecting value and the second vibration detecting value is obtained;

detecting a vibration of the outer ring attaching member attached to the outer ring so that a third vibration detecting value is obtained;

calculating a transfer function from the third vibration detecting value and the added value so that a resonance frequency of the bearing device is determined; and calculating a radial rigidity of the bearing device from the transfer function.

15. An apparatus for producing a bearing device including a bearing having an inner ring, a shaft attached to the inner ring, an outer ring and an outer ring attaching member attached to the outer ring, comprising:

an input vibration unit for giving a radial input vibration to one of the each inner ring and the shaft;

a vibration detecting unit for detecting a vibration of the outer ring attaching member;

a transfer function calculating unit for calculating a transfer function from an output of the vibration detecting unit and the radial input vibration to determine a resonance frequency of the bearing device; and a radial rigidity calculating unit for determining a radial rigidity of the bearing device on the basis of the resonance frequency of the bearing device determined by the transfer function calculating unit.

16. An apparatus for producing a bearing device including a pair of bearing having an inner ring and an outer ring, a shaft attached to the inner ring, and an outer ring attaching member attached to the outer ring, comprising:

an input vibration unit for giving a radial input vibration to one of each inner ring and both ends of the shaft attached to the inner ring;

a pair of vibration detecting units for detecting a vibration of one of the each inner ring and the both ends of the shaft attached to the inner ring;

an adding unit for adding an output of the pair of vibration detecting units;

a vibration detecting unit for detecting a vibration of the outer ring attaching member;

a transfer function calculating unit for calculating a transfer function from an output of the vibration detecting unit and the output of the adding unit to determine a resonance frequency of the bearing device; and a radial rigidity calculating unit for determining a radial rigidity of the bearing device on the basis of the resonance frequency of the bearing device determined by the transfer function calculating unit.

17. A method for producing a bearing device including a pair of bearing having an inner ring and an outer ring, a shaft attached to the inner ring and an outer ring attaching member attached to the outer ring, comprising the steps of:

giving a radial input vibration to one of each inner ring and both ends of the shaft attached to the inner ring;

detecting a vibration of one of the each inner ring and the both ends of the shaft attached to the inner ring so that a first vibration detecting value and a second vibration detecting value are obtained;

adding a first vibration and a second vibration so that an added value of the first vibration detecting value and the second vibration detecting value is obtained;

detecting a vibration of the outer ring attaching member attached to the outer ring so that a third vibration detecting value is obtained;

calculating a transfer function from the third vibration detecting value and the added value so that a resonance frequency of the bearing device is determined; and calculating a radial rigidity of the bearing device from the transfer function.

* * * * *